3,728,108
PROCESS FOR THE PRODUCTION OF REINFORCED COMPOSITE ALLOYS
Raymond Sifferlen, Saint-Ismier, Claude Guichard, Fontaines, and Jean-Claude Soret, Saint-Egreve, France, assignors to Societe Industrielle de Combustible Nucleaire, Annecy, France
Filed Mar. 31, 1970, Ser. No. 24,252
Claims priority, application France, Mar. 31, 1969, 6909746
Int. Cl. C22c 1/00
U.S. Cl. 75—135          8 Claims

ABSTRACT OF THE DISCLOSURE

Reinforced composite alloys having improved characteristics and good ductility comprising a base metal or a metal alloy in which filaments or particles which are insoluble in the base metal, both in the solid state and the liquid state, and further characterized in that the particles or filaments are dispersed in a homogeneous manner in the base metal and perfectly bonded to the base metal are disclosed. A process and an apparatus for the preparation of the reinforced composite alloys are disclosed also.

BACKGROUND OF THE INVENTION

(1) Field of the invention

The present invention relates to reinforced composite alloys, and also to a process for the formation of composite alloys, reinforced by dispersed particles. It is also concerned with an apparatus for carrying this process into effect, by continuous casting or not.

(2) Description of the prior art

Composite materials are known which are hardened by dispersion of a second phase, from which it was immediately envisioned that it would be possible to supply materials with high characteristics, such as composite alloys reinforced by monocrystalline filaments or by dispersed particles. In order to extend the range of mechanical properties of the metals, it is possible to reinforce a metallic matrix with a second phase having very high characteristics and which is immiscible at any temperature. The nature and the percentage of the dispersed products enable the physical properties of the composite alloys which are obtained to be adapted to even the most advanced technical requirements.

It is necessary to note that such composite alloys are different from alloys with dispersed phases, obtained by a purely metallurgical procedure, with the aid of a hardening treatment by precipitation.

It is known that such composite alloys can be obtained by a process which consists in a sintering followed by an extrusion. However, the materials thus obtained are liable to show a defect as regards homogeneity; actually, after sintering the components, the dispersed particles introduced into the matrix are not always completely in contact with this latter, so that a certain residual porosity continues to exist. The extrusion operations only partially reduce the sintering defects, by aligning particularly the heterogeneities. In all cases, a considerable reduction in ductility is found in these products.

Another process for obtaining composite alloys consists in dispersing powders in a matrix in the liquid phase. Using this process, it is possible to obtain an intimate union between the dispersed products and the matrix, if the temperature of the liquid phase is sufficiently high, but it is difficult to avoid sedimentation and segregation effects; actually, cooling of the materials in the mass is slow and their solidification commences on the internal walls of the crucibles or molds, so that there is decantation of the most dense particles or emersion of the particles which are lighter than the liquid metal. Finally, this process supplies, after cooling, a block in which the periphery can be substantially homogeneous, but in which the interior is far from having the desired homogeneity. Under these conditions, a subsequent extrusion is then insufficient to impart the required homogeneity to such a material.

DESCRIPTION OF THE INVENTION

The interest presented by the composite alloys in question induced a detailed study of the question. Work carried out has led to the conclusions that the heterogeneities and the disadvantages of the aforementioned composite alloys were essentially due to the fact that the additions made to the base matrix were not all perfectly wetted by the liquid forming the matrix. During tests which were carried out, it was found that this result could be obtained by using, as additions dispersed in the base metal, fine refractory particles or monocrystalline filaments having a melting point higher than that of the base metal and as high as possible, so as to permit the final shaping of the desired composite alloy, for example, by continuous casting or not, while sufficiently lowering the surface tension of the liquid base metal.

DETAILED DESCRIPTION OF THE INVENTION

As particulate additions, it is possible to use particles having average dimensions which are between 100 A. and 10$\mu$, formed of refractory compounds with a high elasticity modulus, such as the oxides $Al_2O_3$, BeO, CaO, $CeO_2$, $TiO_2$, MgO, $ThO_2$, $UO_2$, $ZrO_2$, the carbides $B_4C$, HfC, NbC, SiC, TaC, TiC, WC, ZrC, or $ZrC_4TaC$, nitrides such as AlN, BN, TaN, TiN, UN, ZrN, borides such as $CeB_6$, $HfB_2$, $NaB_2$, $TaB_2$, $TiB_2$, $ZrB_2$. Mixtures of these materials may be used as well as high modulus materials such as B, Be, C, Mo, and W. Their level will in general be between 0.5 and 20% by volume, depending on the dimensions of the particles.

It is also possible to use monocrystalline filaments, such as trichites of $Al_2O_3$, SiC, C, B, Be or other similar compounds.

As additions it is also possible to use alloys of metals, chemical compounds of their mixtures, all chosen after testing, as a function of the desired final composite alloy.

The quantity of additions being used is chosen as a function of the qualities of the composite alloys to be formed, taking into account the fact that the homogeneity of their dispersion in the base metal and their complete solidarity with this metal depend on the junction angle between a drop of this metal and the refractory compound constituting the particles or monocrystalline filaments. It is known that this angle must be smaller than or equal to 90°, for the addition product to be wetted by the liquid metal.

The base metal can, for example, be magnesium, aluminum, uranium, nickel, steel, iron, chromium, cobalt or their mixtures or alloys.

A first object of the present invention is, as a novel industrial product, a composite alloy reinforced by monocrystalline filaments or particles composed of a base metal or metal alloy in which are dispersed filaments or particles which are insoluble in the base metal, both in the solid state and in the liquid state, characterized in that the particles or filaments are dispersed in a perfectly homogeneous manner in the base metal, perfectly united with the base metal and individually solid with this metal without residual porosity, said composite alloys thus having improved characteristics and especially good ductility.

It was effectively established that the alloy according to the invention had improved characteristics as compared with the sintered products of like composition, and that the union between the base metal and the particles or filaments existed without residual porosity.

The invention is also concerned with a process for preparing composite alloys according to the invention. This process of dispersing fine particulate additions in a base metal is characterized in that the particles or monocrystalline filaments to be added to the base metal are brought into fluidized suspension or worked in a stream of preheated gas which is neutral with respect to the particles or filaments and the base metal, being desorbed or superficially activated, that the dispersion is introduced with energetic stirring into the molten base metal, brought in a receptacle of any known suitable type to a temperature such that the connecting angle of the liquid metal with the compound forming the dispersion is smaller than or equal to 90° and that the homogeneous composite product is then degasified before being given its desired final shape, all the operations extending over a short period of time, which can be from about 1 to about 15 minutes.

The homogeneous composite mixture formed of the base metal in which the particulate additions are distributed is advantageously transferred under vacuum to facilitate its degasification; for being brought to the final form, it is possible at will to carry out successive castings or preferably a continuous casting. In order to avoid segregation during the solidification, a rapid solidification will be assured by means of ingot molds or water-cooled molds, or by a liquid metal such as Na, K, or inert gas.

The inert gas serving to fluidize the particulate additions can for example be argon or helium.

The process according to the invention permits reinforced composite alloys to be supplied under industrial conditions.

For carrying the above process into effect, it is possible with advantage to employ an apparatus combining assemblies for the fluidization, stirring and introduction of the particulate additions, with the metal or other base material, under conditions such that the product obtained is degasified and can be cast. The apparatus can in addition be advantageously associated with the continuous casting arrangement described in French patent application 170,599, filed by applicants on Oct. 18, 1968.

In its most general form, the apparatus for forming reinforced composite alloys according to the invention is characterized by means for supplying particulate additions, means for causing rapid circulation of a gas which is neutral with respect to the base metal and the additions, means for introducing the said additions into the said gas, means for assuring the rapid displacement of the fluidized bed of the additions with the gas, a crucible supplied with liquid base metal at a constant temperature and with a substantially constant level, means connected to the displacement means of the additions fluidized in the neutral gas and designed simultaneously to stir the said metal and to introduce the said additions thereinto, while stirring, means for transferring the stirred mixture of the base metal and additions into another receptacle in such a way as to desorb and degasify them.

In one particularly advantageous embodiment, the apparatus is characterized by a receptacle containing the addition material to be fluidized, a circuit supplied with neutral gas and comprising a curved conduit which first ascends and then descends and of which the downstream end is connected to the said receptacle, a vertical tower of which the base is connected to the descending conduit by a widened portion, said tower successively comprising a cylindrical part coated with a getter, a water-cooling wall, a trap kept at low temperature and a discharge tube connected to the fluidization tower by a profiled outlet, a crucible closed at its upper end and arranged so that the liquid base metal can be introduced thereinto at a position about ⅔ from the bottom, means for regulating the level of the said metal in the crucible at a substantially constant level, an orifice in the crucible for the fluid-tight passage of the discharge tube from the tower of the fluidized additions in the neutral gas, an agitator which is driven in rotation and traversed by the said addition supply tube and terminated by a dispersion nozzle, a mechanism for regulating the height position of the said agitator, means for maintaining a certain pressure in the crucible, means such as a pipe, kept at a predetermined temperature and designed for introducing the contents of the crucible into a vacuum chamber, a starting pump fast with the said introduction means which dips into the liquid metal, and a container connected to the vacuum chamber to serve as a receptacle for the metal charged with additions.

According to a modification, means by which the fluidized addition flow can be taken in by the liquid metal are interposed between the reserve supply of liquid metal and the crucible, so that in penetrating into the crucible, the liquid metal already contains the fine refractory particles as well as the transporting neutral gas, but this latter is easily eliminated in the crucible. In this case, the connection between the molten metal supply, for example a ladle, is extended by a conduit equipped with a pump, for example, an electromagnetic pump, said conduit discharging into a liquid metal ejector, formed by a small diameter conduit followed by a venturi, at which also terminates the conduit of powder fluidized by a neutral gas coming from the fluidization tower and, at the outlet from the venturi, a conduit carrying the mixture which is obtained towards the crucible with a mechanical or electromagnetic agitator and a level detector, regulating the delivery of the electromagnetic pump upstream of the metal ejector.

BRIEF DESCRIPTION OF THE ACCOMPANYING DRAWINGS

Various embodiments of the apparatus for forming the composite alloys according to the invention are hereinafter described by reference to the accompanying drawings, in which.

Figure 1:
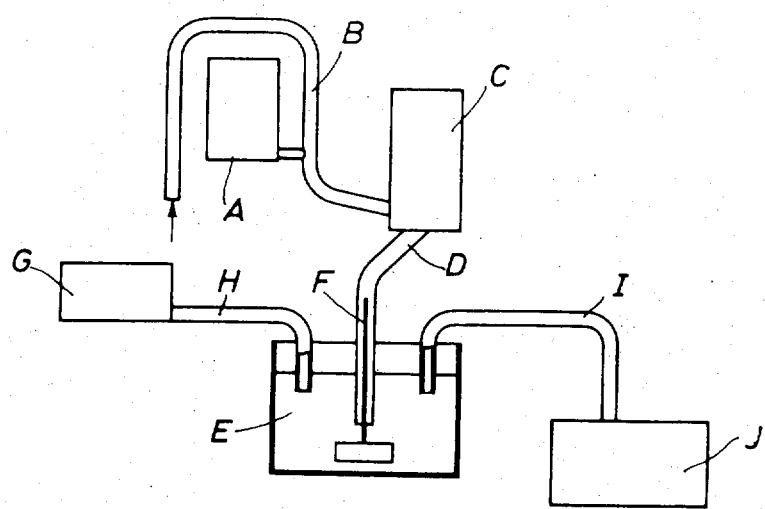
FIG. 1 represents diagrammatically an apparatus according to the invention.

As shown in FIG. 1, the apparatus according to the invention is formed by a supply means A for additions which are to be fluidized, connected by a conduit B, in which an inert gas is circulating, to a fluidizing tower C, which tower delivers the fluidized additions through a conduit D into a closed crucible E fitted with a rotary agitator F. The ladle G for molten metal is connected by a conduit H, of which the delivery is adjustable, to the interior of the crucible E, said conduit discharging at ⅔ of the height of the crucible. The crucible E is connected by a pipe I to a vacuum chamber J, in which the composite alloy consisting of metal and additions according to the invention is desorbed or degasified. The vacuum chamber can in its turn be connected to an ingot mold casting arrangement or to a continuous casting arrangement, such as that described in the aforementioned patent application 170,599. The ingot molds are preferably equipped for accelerated cooling, by any suitable known means.

Figure 2:
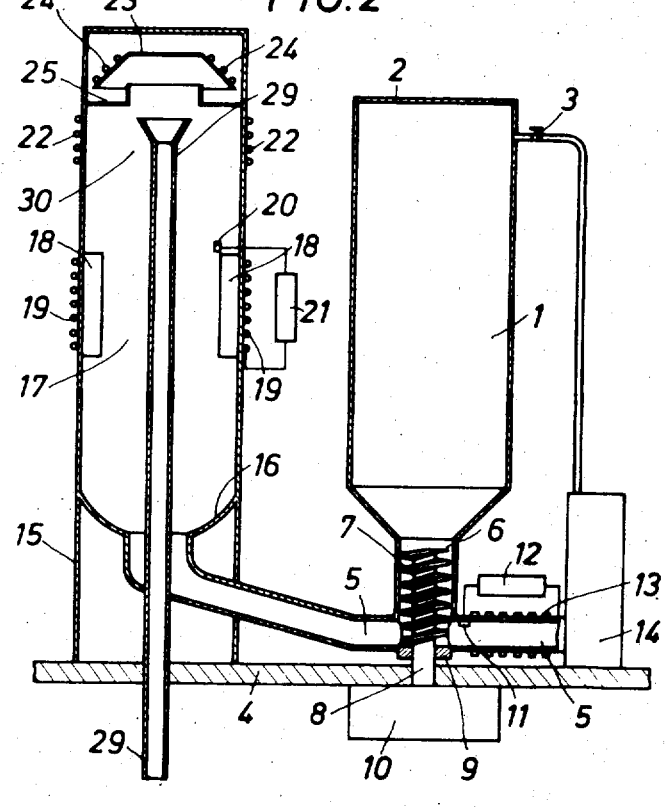
FIG. 2 is a diagrammatic vertical section of the part of the apparatus serving for the fluidization.

In FIG. 2, the fluidization assembly A, B, C of the apparatus for forming reinforced composite alloys is formed by a cylindrical reservoir 1 which receives the additions and of which the base is frusto-conical, the reservoir being closed by a cover 2 and comprising in its upper part a pipeline with a cock 3, the opening of which is adjustable. The bottom of the cylindrical reservoir 1 is fixed on a frame 4 and is connected in fluid-tight manner to a pipeline 5 by a passage 6. Disposed inside the cylindrical passage 6 is a screw conveyor 7 mounted on a shaft 8 and designed to move the additional materials in powder form. A joint 9 placed in the lower wall of the pipeline 5 ensures the fluid-tight passage of the shaft 8, which is driven in rotation by a variable speed electric motor 10. A temperature measuring cell 11 placed inside the pipeline 5 is connected to the input of a servomechanism 12, which regulates the supply of electric current to a heating coil 13 for bringing the additions to the desired temperature. An argon source 14, which is the neutral gas in the present case, is under adjustable pressure and is connected to a first end of the pipeline 5 and the cock 3.

A vertical pulverization tower 15 fixed on the frame 4 is connected at its base to the second end of the pipeline 5 by a flared section 16. In an upward direction and starting from a third of the height of the pulverization tower, the internal section of the latter decreases and forms a cylindrical passage 17 which extends to about ⅘ of the height of the tower 15. Disposed on the lower third of the internal wall of the passage is a zirconium getter 18, heated by an electrically heated coil 19. A temperature measuring cell 20 and a servomechanism 21 regulate the admission of the electric current to the heating coil 19. A water cooling circuit 22 encloses the upper part of the passage wall 17.

A nitrogen trap 23 cooled by a liquid nitrogen circuit 24 is mounted in the pulverization tower about the upper end of the passage 17. A trough 25 is disposed beneath the nitrogen trap. A discharge tube 29 is connected to the passage 17 by a venturi 30, which is positioned between the cooling circuit 22 and the getter 18.

Figure 3:
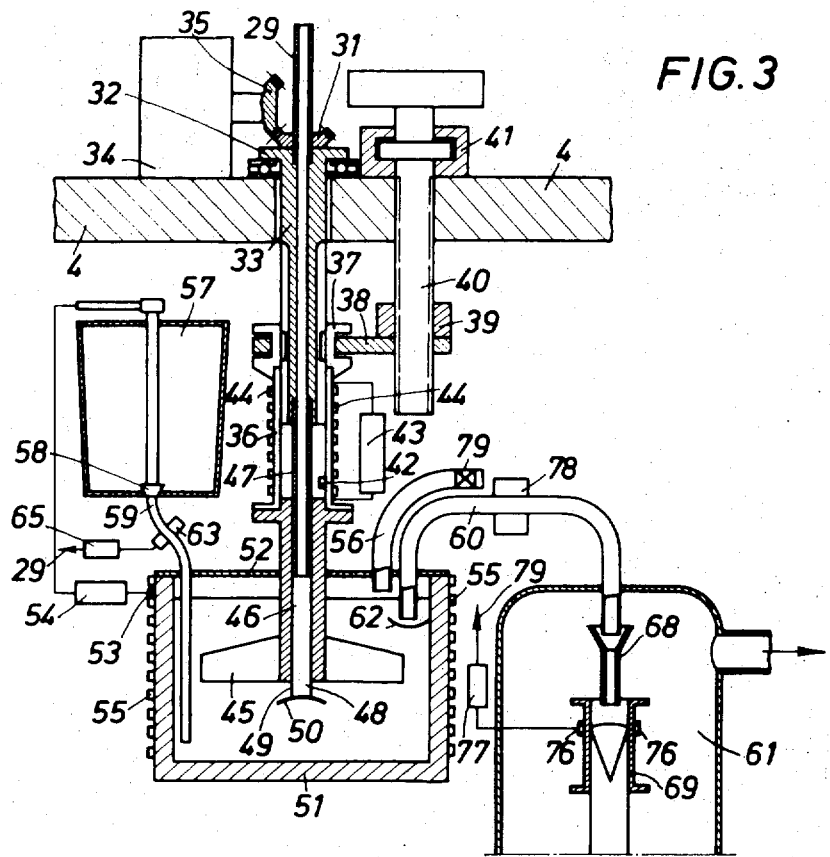
FIG. 3 is a diagrammatic view of an installation according to the invention, equipped for continuous casting of the composite alloy.

In the case where the composite alloy is intended to be continuously cast, the assembly A, B, C is connected as follows to the stirrer-type mixer (FIG. 3) by the tube 29 for discharging the fluidized additions: a pinion 31, which rests on a bearing 32, serves as a support for a hollow shaft 33 and the tube 29, the interior of this hollow shaft 33 being connected in fluid-tight manner to the tube 29. The hollow shaft 33, the tube 29 and the pinion 31 have the same vertical axis. An electric motor 34 imparts, by means of a pinion 35, to the hollow shaft 33 a rotational movement about its axis. The hollow shaft 33 extends into a second vertical hollow shaft 36, in which it is able to slide and drive the latter in rotation, by means of vertical splines (not shown). A hollow shaft 36 is carried by a bearing 37, which is fixed on a plate 38. A metal block 39 which is tapped and welded on the plate 38, is kept at an adjustable height by a threaded shaft 40, which is maintained at the appropriate height by a bearing 41 fixed on the frame 4. It is thus seen that the discharge tube 29 for the fluidized mixture traverses the mechanism of the agitator in the succession of hollow shafts 33 and 36.

The threaded shaft 40 is driven in rotation by any known suitable means which are manually adjustable. A temperature measuring cell 42 placed inside the shaft 36 is connected to a servomechanism 43 which controls the admission of electric current into the heating coil 44 disposed on the external surface of the shaft 36. A rotary liquid agitator 45 is vertically disposed and is fixed on the lower end of the hollow shaft 36. A cylindrical passage 46 extends through this agitator 45; this passage has the same axis as the hollow shaft and permits a second vertical tube 47 to extend in sealed manner thereinto, said tube extending in sealed manner the passage formed by the interior of the first hollow shaft.

The passage 46 terminates inside the crucible 51 and ends in a nozzle 48 positioned beneath the agitator. This nozzle is formed by a cylinder 49 which is closed at its lower end by a circular convex plate 50.

The cylinder 49, which has the same axis and diameter as the passage 46, is formed with a very large number of very fine holes. The center of the plate 50 is disposed on the axis of the passage 46 and the diameter of the plate 50 is larger than that of the passage. A crucible 51 of internally cylindrical form has an internal diameter slightly larger than the laregst horizontal dimension of the agitator 45, with which it is coaxial. The cover 52 closes the crucible 51. A temperature measuring cell 53 placed on the rim of the crucible is connected to the inlet of a servomechanism 54 which controls the admission of current into the heating coil 55 placed on the external lateral surface of the crucible.

A gas suction pump 79 is connected to the interior of the crucible by the tube 56. The ladle 57, which receives the molten base metal, is placed at a higher level than that of the crucible 51. The bottom of the ladle 57 is closed by a stopper 58 and connected to the bottom of the crucible by a pipe 59 equipped with a flow meter 63, with which is associated a servomechanism 65 permitting the flow of the fluidized bed coming from the tube 29 to be made dependent on the flow of metal coming from the ladle 57. The interior of the crucible 51 is connected by the pipe 60 to the vacuum chamber 61, which is here in accordance with the arrangement described in the aforementioned patent application 170,599. The pipe 60 is of small section and extends through the cover 52 of the crucible, and draws off the liquid at a level disposed in the region of ⅔ of the height of the crucible, starting from the bottom thereof. A circular screen 62 is fixed to the internal space of the crucible 51, beneath the inlet of the pipe 60; the purpose of this plate is to make it more difficult for argon bubbles coming from the nozzle 48 to enter the pipe 60. The pipe 60 extends in fluid-tight manner through the upper wall of the vacuum chamber and ends in a distributor 68, of which the small nozzle with three grooves of small section ensures a substantially laminar flow of the liquid into the ingot mold 69. A level detector 76 is connected by a servomechanism 77 to the suction pump 79, which regulates the pressure obtaining in the crucible. An electromagnetic pump for liquid metals 78 ensures the commencement of the flow in the pipe 60.

Figure 4:
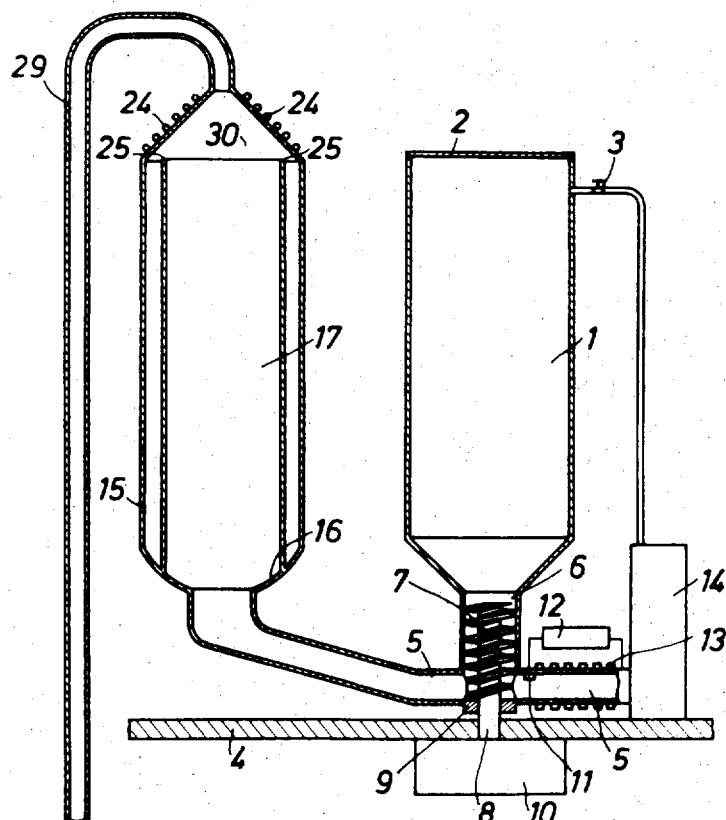
FIG. 4 is a modification of the fluidizing arrangement shown in FIG. 2.

FIG. 4 shows a modification of the installation, in which the discharge tube 29 of the fluidizing arrangement is connected to the passage 17 by a venturi 30 formed in the top of the pulverization tower.

Figure 5:
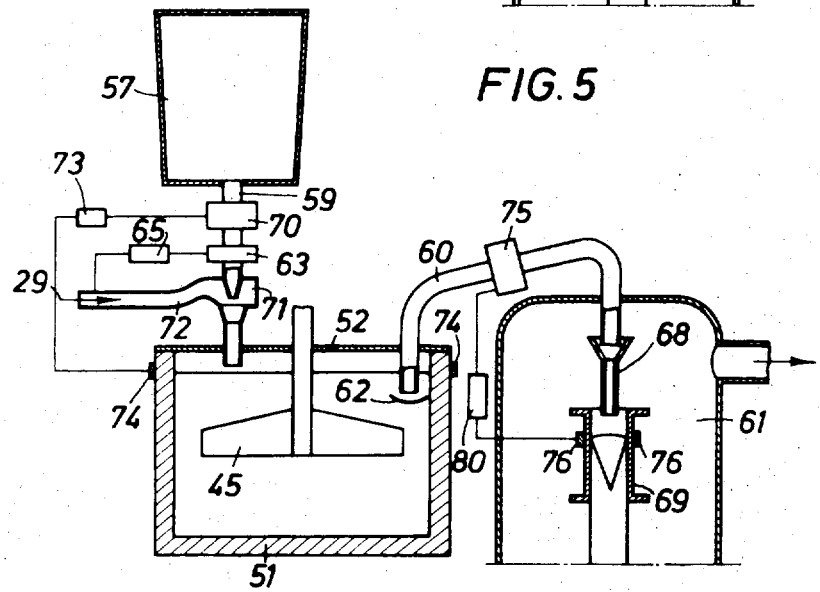
FIG. 5 is a diagrammatic view of a modification of the apparatus according to the invention.
Figure 6:
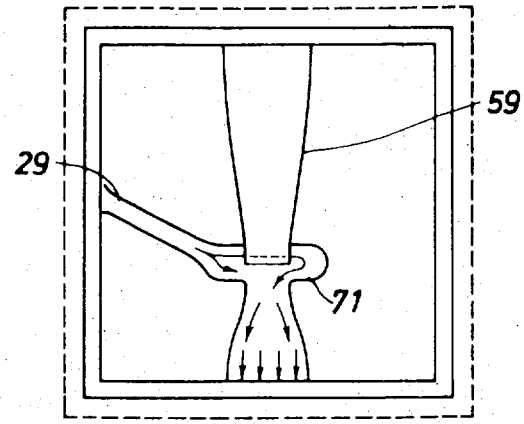
FIG. 6 represents a detail of the arrangement shown in FIG. 5.

It is also possible to effect the dispersion of insoluble particles in the liquid metal by using a suction pump; such an arrangement is shown in FIGS. 5 and 6.

In the case of FIG. 5, the liquid metal ladle 57, as described above, is extended at its base by a conduit 59 fitted with an electromagnetic pump 70 and a flowmeter 63; downstream of the flowmeter, the conduit is narrowed (FIG. 6) in order then to form a progressive widening in venturi form and finally to discharge in the crucible 51 at a certain depth into the molten metal.

The crucible 51 is fitted with an agitator 45 and a level detector 74 associated with a servomechanism 73 which controls the delivery of the electromagnetic pump and the delivery of the fluidized bed so as to keep the level in the crucible 51 constant.

The transfer of the mixture to the ingot mold of the continuous casting arrangement can then be effected as indicated above. As the pressure obtaining in the chamber 51 is subject to variations of oscillations, the apparatus according to the invention advantageously comprises, as shown in FIG. 5, an electromagnetic pump 75 placed on the conduit 60 which discharges into the continuous casting chamber kept under reduced pressure, as indicated in the aforementioned patent application. The delivery of the electromagnetic pump 75 is controlled by a servomechanism 80 associated with the level controller 76 of the ingot mold 69. As in the preceding case, the distributor 68 is extended by a small nozzle having three sections, for example, ensuring a substantially laminar flow of the product into the ingot mold 69.

FIG. 6 shows the details of the arrangement for the dispersion by suction of the powders or insoluble or sparingly soluble filaments in the liquid metal. In its constricted portion, the liquid metal conduit communicates with an annulus 71 surrounding the conduit. The conduit 29 carrying the fluidized bed coming from the fluidization tower opens into this annulus through the pipeline 72.

The operation of the arrangement is as follows: the powders to be mixed with the molten metals are introduced into the reservoir 1. The screw conveyor 7 causes these powders to descend into the pipeline 5 with a delivery speed adjustable by acting on the speed of the motor 10. These powders are carried along by the flow of argon coming from the source 14 and which passes to the base of the screw conveyor. A small portion of the argon flow passes between the screw conveyor and the cylinder passage and contributes to eliminating the air contained in the reservoir 1. The cock 3 enables the reservoir 1 to be brought to the same argon pressure as the pressure in the pipeline 5.

The speed of flow of the argon can be regulated in known manner by acting on the pressure of the argon source 14. The temperature cell 11, the servomechanism 12 and the heating coil 13 permit the temperature of the argon flow to be regulated to a constant value. The powders carried along by the argon flow and having the temperature of the latter are fluidized in the lower part of the pulverization tower 15.

The fluidized powders increase in speed in passing into the passage 17. The moisture, oxygen and nitrogen are taken up by the getter 18, which is kept at a suitable temperature by the heating coil 19, as a result of adjustment effected from the temperature measuring cell 20 and the servomechanism 21. This adjustment is completed by the action of the water circulation 22 and by the liquid nitrogen trap 23. The fluidized powders are discharged through the tube 29, assuming a certain higher speed than that which they have in the passage 17, because of the small diameter of this tube.

The fluidized powders are carried along by the argon flow as far as the nozzle 48, passing through the driving mechanism of the agitator 45. The powders can be reheated by the heating coil 44 which is positioned around the hollow shaft 36.

Inside the hollow shaft 36, the temperature is stabilized by the temperature measuring cell 42, the servomechanism 43 and the heating coil 44. The fluidized powders are dispersed by the nozzle 48 in the molten metal which is set in motion by the agitator 45, while the flow of argon passing through the fine holes drilled in the nozzle ascends to the surface of the liquid metal in the form of small bubbles. The molten metal can also be set in motion by an electromagnetic agitator. The molten metal coming from the ladle 57 is introduced into the crucible 51 by way of the stopper 58 and the tube 59. The level of the metal in this liquid crucible is kept at a value which is as constant as possible by means of the measuring cell 52, the servomechanism 54 and the stopper 58.

A relatively low pressure (for example, of the order of 100 mm. Hg) is maintained inside the crucible closed by the cover 52, by means of a high delivery pumping unit, which discharges through the passage 56 the gases entering by way of the crucible, as well as by way of the nozzle 48 and the duct 59.

The intimate and homogeneous mixture of the powder and molten metal is obtained in the crucible 51. The composite product is then cast, using the continuous casting process described in the aforementioned patent application. The product is introduced via the small diameter pipe 60 into a chamber which is kept under vacuum, such as that shown in FIG. 2 of the said patent application. The composite product falls as a fine jet into the distributor, this permitting a very strong degasification of the resultant product. The rate of flow is under the control of the level in the ingot mold, this being effected by means of a servomechanism, which has an effect on the action of the pumping unit 79 which is pumping through the conduit 56.

All the ladles, crucibles, pipes or elements in contact with the liquid mixture are kept at a temperature higher by at least 50 to 100° C. than the melting point of the base metal: the mixing of the solid and liquid phases is in fact assisted by raising the temperature of the liquid metal, which causes a lowering of the forces due to surface tension, but for operating by continuous casting, a slight overheating of the liquid to be cast, smaller than 100° C., is necessary; this temperature variation is assured progressively between the distributor 68 and the ingot mold 69.

The dispersion of the particles in the liquid metal by suction effect (FIGS. 5 and 6) uses the venturi effect of an ejector for drawing the suspended particles into the fluidized bed.

It can be seen more particularly from FIG. 6 that the progressive reduction in the diameter of the conduit 59 causes the liquid metal, driven by the electromagnetic pump 70, to be accelerated in a very appreciable proportion. On the other hand, the vacuum which is produced at the height of the annulus 71 has a strong suction effect on the gaseous flow carrying the particles which are to be dispersed.

At the outlet from the venturi, there is thus found an intimate mixture which is formed by the liquid phase of metal and a solid phase formed of particles, a gaseous phase formed of the carrier gas being associated with this mixture.

When the mixture discharges into the interior of the crucible 51, it is energetically stirred by the agitator 45 and substantially all of the neutral gas is eliminated.

By means of a variable delivery electromagnetic pump, the small diameter pipe 60 ensures the transfer of the composite product from the crucible to the continuous casting device under reduced pressure or under vacuum, in accordance with the aforementioned application. The substantially laminar flow obtained downstream of the distributor 68 makes it possible to obtain a certain orientation of non-spherical particles in the composite product. In addition, this relatively slow flow makes it possible to ensure the necessary temperature transition, and finally it facilitates the discharge of gases and impurities at the outlet of the laminar tubes above the surface of the liquid metal in the ingot mold 69, kept under vacuum or under reduced pressure.

The level controller 76 placed in the ingot mold 69 ensures the stability of the level of the liquid metal by means of a servomechanism 77 operating to regulate with accuracy the delivery of the electromagnetic pump 75.

In the first composite alloys obtained by the process as described in this invention, particles were used which were formed of aluminum oxide with a nominal grain size of 200 A., said oxide crystallizing at 1100° C. in the cubic form of gamma-aluminum oxide and which is transformed at 1200° C. into alpha-aluminum oxide.

This aluminum oxide was dispersed in an industrial quality aluminum with 99.5% of aluminum, melted before-hand in the form of ingots with very large grains. The dispersion was carried out at temperatures between 840° C. and 1050° C. and then the composite alloy was cast at 800° C.

In all cases, a very considerable refining of the grain was found. Examination with an electron microscope made it possible each time to show the sub-structure of these grains as cells of polygonal form and a diameter of the order of a micron.

Since it is easier to incorporate the aluminum oxide particles into an aluminum mass kept at a higher temperature, it is not surprising that it was confirmed that the grain structure after cooling was finer as the dispersion temperature was higher and approached 1050° C.

The same observations were confirmed when subsequently using an aluminum of purity 99.997%.

Relatively coarse zirconium dioxide powder, formed of grains with a diameter of one micron, have also been dispersed in the pure aluminum (99.997%). It was confirmed that the wetting is effected at a lower temperature than for aluminum oxide. Hence, the dispersion can be effected under favorable conditions at temperatures which are between 700° C. and 800° C., the casting temperature being 770° C.

Examination with the electron microscope shows the presence of zirconium dioxide particles perfectly wetted with aluminum. Microscopic examination enables the perfect homogeneity of the dispersion to be confirmed.

All the tests carried out led to the confirmation of the fact that the composite metal obtained by the process of his invention always had decidedly improved mechanical properties, shown particularly by a doubled ductility.

What is claimed is:

1. A process for preparing a reinforced composite alloy without residual porosity having improved characteristics and particularly a good ductility comprised of a base metal or metal alloy in which are dispersed an addition of filaments or particles which are insoluble in said base metal, both in the solid state and in the liquid state, and further characterized in that the particles or filaments are dispersed in a perfectly homogeneous manner in the base metal, are perfectly bonded to the base metal and individually are solid with the base metal, comprising the steps of:
    (a) forming a dispersion of particles or monocrystalline filaments of a refractory material using a fluidized suspension in a stream of preheated gas which is neutral with respect to the particles or filaments and the base metal;
    (b) desorbing moisture, oxygen and nitrogen from said particles or filaments to superficially activate said particles or filaments;
    (c) introducing said dispersion into a molten base metal with energetic stirring at a temperature such that the connecting angle between the molten metal and the refractory compound forming the particles or filaments is 90° or less to produce a homogeneous composite product; and
    (d) degasing the homogeneous composite product.

2. The process according to claim 1, characterized in that the amount of additions used ranges from 0.5 to 20% by volume of the base metal, and wherein the temperature is such that the connecting angle of the liquid metal and the additions of refractory compound forming the particles or filaments is smaller than 90°.

3. The process according to claim 1, wherein the homogeneous composite product formed of the base metal and the additions is degased under vacuum.

4. The process according to claim 1, wherein the gas used is an inert gas selected from the group consisting of argon and helium.

5. The process according to claim 1, wherein the additions are particles of refractory compounds having a high elasticity modulus.

6. The process of claim 5 wherein the refractory compounds are selected from the group consisting of oxides selected from the group consisting of $Al_2O_3$, BeO, CaO, $CeO_2$, $TiO_2$, MgO, $ThO_2$, $UO_2$ and $ZrO_2$; carbides selected from the group consisting of $B_4C$, HfC, NbC, SiC, TaC, TiC, WC and ZrC; nitrides selected from the group consisting of AlN, Bn, TaN, TiN, UN and ZrW; borides selected from the group consisting of $CeB_6$, $HfB_2$, $NbB_2$, $TaB_2$, $TiB_2$ and $ZrB_2$; and mixtures thereof an a member having a high modulus and selected from the group consisting of B, Be, C, Mo and W, said particles having a dimension of from 100 A. to $10\mu$.

7. The process according to claim 1, wherein the additions are a member selected from the group consisting of trichites of $Al_2O_3$, SiC, C, B and Be.

8. The process according to claim 1, wherein the base metal is selected from the group consisting of magnesium, aluminum, iron, nickel, chromium, cobalt, mixtures thereof and alloys thereof.

References Cited

UNITED STATES PATENTS

| | | | |
|---|---|---|---|
| 2,793,949 | 5/1957 | Imich | 75—135 |
| 3,001,864 | 9/1961 | Muller et al. | 75—53 |
| 3,282,658 | 11/1966 | Wainer | 29—183.5 |
| 3,468,658 | 9/1969 | Herald et al. | 75—122 |
| 3,574,609 | 4/1971 | Finlay et al. | 75—153 |

L. DEWAYNE RUTLEDGE, Primary Examiner

E. L. WEISE, Assistant Examiner

U.S. Cl. X.R.

75—138; 266—34